United States Patent
Berghmans et al.

(10) Patent No.: US 6,455,599 B1
(45) Date of Patent: Sep. 24, 2002

(54) PROCESS FOR THE PREPARATION OF EXPANDED POLYVINYLARENE PARTICLES

(75) Inventors: Michel Florentine Jozef Berghmans; Karel Cornelis Bleijenberg, both of Breda; Alphonsus Catharina Gerardus Metsaars, Rijen, all of (NL)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 09/786,806

(22) PCT Filed: Sep. 14, 1999

(86) PCT No.: PCT/EP99/06996

§ 371 (c)(1),
(2), (4) Date: Jun. 28, 2001

(87) PCT Pub. No.: WO00/15704

PCT Pub. Date: Mar. 23, 2000

(30) Foreign Application Priority Data

Sep. 16, 1998 (NL) .......................................... 98203097

(51) Int. Cl.$^7$ ................................ C08J 9/22; C08J 9/18
(52) U.S. Cl. ............................. 521/58; 264/50; 264/51; 264/53; 264/DIG. 9
(58) Field of Search .............................. 521/58; 264/50, 264/51, 53, DIG. 9

(56) References Cited

U.S. PATENT DOCUMENTS 4,911,869 A * 3/1990 Meyer et al. ................. 264/50
5,049,328 A * 9/1991 Meyer et al.

\* cited by examiner

Primary Examiner—Morton Foelak
(74) Attorney, Agent, or Firm—Suzanne Kikel

(57) ABSTRACT

Process for the preparation of expanded polyvinylarene particles in which polyvinylarene particles pre-expanded to an apparent density $d_o$ ranging between 600 and 200 kg/m$^3$ are impregnated by an inorganic gas, and the impregnated particles thus obtained are expanded to an apparent density of at least three times lower than $d_o$.

10 Claims, No Drawings

PROCESS FOR THE PREPARATION OF EXPANDED POLYVINYLARENE PARTICLES

The present invention relates to a process for the preparation of expanded polyvinylarene particles and to a process for the preparation of foamed articles from these expanded particles.

For many years it has been known that particles of polyvinylarenes, such as polystyrene, can be rendered expandable and that the particles thus obtained can be used in the preparation of foamed articles. In this respect reference is made to, e.g., U.S. Pat. No. 2,681,321 which discloses a process in which polystyrene particles are exposed to liquid hydrocarbons and treated such that the liquid hydrocarbon is dispersed in the polystyrene particles. Particles thus prepared contain generally 4 to 8% by weight of such liquid hydrocarbon, such as butane, n-pentane or mixtures of pentanes. Also halogenated hydrocarbons have been used for this purpose. These particles can then be expanded to particles with a reduced density. Apparent densities for packaging particles typically are 20 to 60 g/l. Once expanded, the particles are fused in a steam-heated mould to yield a foamed article of a desired shape.

One of the factors that influence the expansion of the polystyrene particles is the amount of hydrocarbon blowing agent. From Kirk Othmer, Encyclopedia of Chemical Technology, third edition, Volume 21, page 838, it can be read that the density of particles containing 5.7% wt n-pentane is typically 1080 kg/m$^3$, compared to a value of 1050 kg/m$^3$ for pure polystyrene beads and compared with a calculated density of 1020 kg/m$^3$ for a simple mixture in which the n-pentane is dissolved in polystyrene. If all pentane would be in voids the calculated density would be 1120 kg/m$^3$. Thus it has been suggested that part of the hydrocarbon blowing agent is present in little voids in the polystyrene. The skilled man will appreciate that the above densities are particle densities, which can be recalculated to apparent densities. A particle density of 1080 kg/m$^3$ corresponds to an apparent density of around 720 kg/m$^3$.

A drawback of the present practice is that during the transport and storage of the unexpanded particles hydrocarbons may evaporate from the particles, in particular from the voids. When the particles are transported and/or stored at varying temperatures and/or duration, the amounts of e.g. pentane retained may vary significantly. Apart from extra safety measures that have to be taken during transport, like gas-tight packaging, it will be appreciated that such a variation may have an effect on the resulting foam obtained after expansion.

Furthermore, the expansion process itself also causes that hydrocarbons originally present in the unexpanded particles are emitted into the environment. In order to reduce the emissions complicated equipment has been developed to collect the emitted hydrocarbons for further handling, e.g. combustion. This equipment is to be installed in the facilities of the end-user of the particles, i.e. the customer who produces the foamed articles. This requires additional expertise and investments with these customers.

The present invention intends to eradicate the above drawbacks by providing a process for the preparation of expanded polyvinylarene particles in which polyvinylarene particles pre-expanded to an apparent density do ranging between 600 and 200 kg/m$^3$ are impregnated by an inorganic gas, and the impregnated particles thus obtained are expanded to an apparent density of at least three times lower than $d_o$.

The advantages of the present invention are enormous. At the facilities of the polyvinylarene manufacturer, unexpanded polyvinylarene polymer particles containing a blowing agent are prepared and the latter particles are pre-expanded to a reduced apparent density in the range from 600 to 200 g/l. If this density reduction is obtained by the use of a hydrocarbon blowing agent, the emitted blowing agent can be collected and handled further, (e.g. re-used) in the plant of the polyvinyl-arene manufacturer.

Secondly, the polyvinylarene manufacturer has complete control over the product quality in the period between production and use by the customer. Using the process of the present invention, the polyvinylarene manufacturer will be in a position to extract at least the blowing agent from the voids. If he has done so, there will be no loss of blowing agent during transport and/or storage of the pre-expanded particles. This will ensure that the customer will always obtain pre-expanded particles with a consistent cell structure and with consistent foaming properties.

Because the pre-expansion has been conducted such that the apparent density $d_o$ ranges from 600 to 200 kg/m$^3$, the volume increase compared to the volume of the original unexpanded particle is from about 1.5 to less than 3 times. This increase is so small that the transportation costs do not become such that they outweigh the advantages. On the other hand, the volume increase does ensure that pores are present in the pre-expanded particle having such a size that the customer can impregnate a reasonable amount of inorganic gas into them, in order to render the particles sufficiently expandable.

The pre-expanded polyvinylarene particles of the present invention have an apparent density do of 600–200 kg/m$^3$. Preferably, the apparent density do ranges from 530 to 250 kg/m$^3$, more preferably from 500 to 300 kg/m$^3$ and most preferably from 450 to 350 kg/m$^3$.

The pre-expanded particles can be obtained by pre-expansion of any unexpanded polyvinylarene particle containing a sufficient amount of blowing agent to arrive at the apparent densities as defined. The unexpanded polyvinylarene particles may be prepared by various methods, including solution polymerisation, bulk polymerisation, suspension polymerisation or mixtures of these methods. The blowing agent may be added after the polymerisation, as described in U.S. Pat. No. 2,681,321. It is also possible to add the blowing agent during the polymerisation of the vinylarene monomers or to add it before the polymerisation to the monomers. Preferably, the blowing agent is added during the polymerisation of the vinylarene monomers, the polymerisation advantageously being conducted in suspension. The unexpanded polyvinylarene particles suitably have an average particle size of 0.2–3 mm.

Suitable particles for use in the present invention are e.g. described in U.S. Pat. No. 3,973,884, which describes polymer particles with a relatively high density. These high density polymer particles are obtained by pre-expansion of unexpanded polymer particles containing 5.8–7.0% by weight pentane. From GB patent No. 1 106 143 and PCT application No. WO 98/01489 it is known that water may also be used as blowing agent. Apart from hydrocarbons, e.g. $C_2$–$C_6$ hydrocarbons or halogenated hydrocarbons, or water, other blowing agents may be used as well. Examples are inorganic blowing agents (carbon dioxide) or so-called chemical blowing agents, i.e. compounds that release gaseous components upon heating. The latter compounds are usually solid and are particularly used in bulk polymerisation techniques. Examples of chemical blowing agents are carbon dioxide-or nitrogen-liberating solid compounds like azodicarbonamide.

U.S. Pat. No. 3,973,884, mentioned in the previous paragraph, specifically describes that for the production of particles for higher-density applications it is possible to use less of pentane or other blowing agent than has been used in particles for low-density applications. However, it continues by saying that the difference is small and that in particles for low-density applications the pentane content may be 6–7.2% wt, which is hardly more than the 5.8 to 7.0% by weight pentane content of the particles for high-density applications.

It has now been found that smaller amounts of hydrocarbon blowing agent also enable a density reduction to a level of between 600 and 200 kg/m$^3$. The resulting pre-expanded particles are extra advantageous in view of environmental and safety concerns during transport and storage. Therefore, it is preferred to prepare the pre-expanded particles according to the invention by using a process in which expandable polyvinylarene particles containing from 0.5 to 4% by weight of a volatile organic blowing agent, based on polyvinylarene, are pre-expanded to an apparent density of 600 to 200 kg/m$^3$. A most preferred particle for use in the present invention is the porous particle as described in Applicant's co-pending application No. 98203099.1. This particle contains 2.0% by weight or less of a volatile organic blowing agent, based on the weight of polyvinylarene, preferably less than 1.5% by weight. This particle can be obtained by e.g. pre-expansion of an unexpanded polyvinylarene particle which is prepared by aqueous suspension polymerisation of vinylarene monomers in the presence of a nucleating agent and from 0.1 to 1% by weight of a free radical initiator, wherein a $C_{2-6}$ hydrocarbon blowing agent is added before, during or after the polymerisation, wherein the amount of blowing agent is from 0.5 to 4% by weight, based on the amount of vinylarene. Alternatively, they may be prepared by pre-expansion of the particles obtained by a process as described in Applicant's co-pending application No. 98203098.3. Herein, compact polyvinylarene polymer particles are impregnated by an inorganic $N_2$- and/or $O_2$-containing gas at a temperature below 95° C. and at a pressure of 100 to 2,000 kPa gauge, to yield expandable polyvinylarene particles.

Pre-expansion of an unexpanded polyvinylarene particle into the pre-expanded particle can be conducted in any suitable manner. Suitable well known methods are the use of hot air, a hot oil bath, infra red radiation microwave radiation or steam. Steam may be used of temperatures of 100 to 168° C. at pressures of 0 to 600 kPa gauge, depending on the presence of additives and/or other polymers in the polyvinylarene particle. In the case of polystyrene, it is preferred to use saturated steam of a temperature of 100–125° C. at pressures of 0 to 230 kPa gauge. The unexpanded polyvinylarene particles may also be pre-expanded by exposing them to warm water. This method is preferred. In this embodiment the water suitably has a temperature of from 60 to 100° C. and the exposure has a duration of 5 to 120 minutes. The most preferred method to pre-expand the unexpanded poly-vinylarene particles in the present invention is the use of hot air, having a temperature of from 90–200° C., preferably from 95–160° C. and most preferably from 100–140° C. The exposure preferably has a duration of up to 3 hours.

A further preferred particle for use in the present invention is a particle that has been pre-expanded "in-situ". Hereto, styrene is bulk polymerised in an extruder in the presence of a blowing agent. When the hot polymer melt exits the extruder, the blowing agent will be released to effect pre-expansion to a density of 600–200 kg/m$^3$. The slightly expanded strands of polymer are then cut to obtain the particles for use in the present invention. In this technique, it will be preferred to use carbon dioxide or chemical blowing agents.

The vinylarene monomer comprised in the polymer of the present process consists preferably mainly of styrene. The polyvinylarene may contain up to 10% mole of another vinyl-group containing monomer, such as acrylonitril, acrylic or methacrylic acid or esters, substituted styrene, such as chlorostyrene, or α-methyl styrene, or divinylbenzene. However, preferably the vinylarene in the polyvinylarene consists for more than 99% mole of styrene. More preferably, the polyvinylarene is polystyrene.

The polymerisation per se is well known in the art. It may be initiated thermally, via free-radical polymerisation or via anionic polymerisation. Although both methods are equally possible, preference is given to free-radical polymerisation. Suitable free-radical initiators can be selected from conventional initiators for free-radical polymerisation. They include in particular organic peroxy compounds, such as peroxides, peroxy carbonates and peresters. Typical examples of these peroxy compounds are $C_{6-20}$ acyl peroxides, such as decanoyl peroxide, benzoyl peroxide, octanoyl peroxide, stearyl peroxide, peresters, such as t-butyl per benzoate, t-butyl peracetate, t-butyl perisobutyrate, t-butylperoxy-(2-ethylhexyl)carbonate, hydroperoxides and dihydrocarbyl peroxides, such as those containing $C_{3-10}$ hydrocarbyl moieties, including di-isopropyl benzene hydro-peroxide, di-t-butyl peroxide, dicumyl peroxide or combinations thereof. Other initiators different from peroxy compounds are also possible, e.g., α,α'-azobisisobutyronitrile.

The suspension polymerisation is suitably carried out in the presence of suspension stabilisers. Suitable suspension stabilisers are well known in the art and comprise poly(vinyl alcohol), gelatine, agar, polyvinyl pyrrolidine, polyacrylamide, inorganic stabilisers such as alumina, bentonite, magnesium silicate or phosphates, like tricalciumphosphate and/or disodiumhydrogen phosphate, optionally in combination with any of the stabilising compounds mentioned earlier. The amount of stabiliser may suitably vary from 0.1 to 0.9% wt, based on the weight of the aqueous phase.

The suspension polymerisation is suitably carried out at two temperature stages, in which the temperature in the first stage is from 85 to 110° C. and in the second stage is from 115 to 140° C.

It may be advantageous to polymerise the vinylarene monomers in the presence of other polymers such as polyphenylene oxide or elastomeric polymers. Suitable polyphenylene oxides have been described in EP-A-350137, EP-A-403023 and EP-A-391499. The polyphenylene oxide is preferably present in an amount between 1 and 30 wt %, based on the amount of vinylarene monomers, and may improve the rigidity of the polyvinylarene polymer. Examples of suitable elastomeric polymers have also been described in EP-A-350137 and comprise (block) copolymers of vinyl substituted aromatic monomer and a conjugated diene monomer. These elastomeric polymers are preferably present in an amount of 0.5 to 10 wt %, based on the amount of vinylarene monomers, and may improve the impact strength of the polyvinylarene polymer.

The unexpanded and/or pre-expanded polyvinylarene particles may contain various conventional additives. Such additives include chain transfer agents, cross-linking agents and nucleating agents. Suitable examples of chain transfer agents are $C_{2-15}$ alkyl mercaptans such as n-dodecyl mercaptan, t-dodecyl mercaptan, t-butyl mercaptan and n-butyl mercaptan. Other agents are pentaphenyl ethane and the dimer of α-methyl styrene. Examples of crosslinking agents are butadiene and divinylbenzene. Nucleating agents are agents that promote cell formation and are suitably used in an amount of 0.01 to 3% by weight, based on vinylarene, preferably in an amount of 0.05 to 2% by weight. Examples of nucleating agents are finely dispersed inorganic compounds, polymer particles and organic solids. Examples are carbonates compounds such as calcium carbonate, sulphate compounds such as barium sulphate and calcium sulphate, silicate compounds such as talc, clay, magnesium silicate, amorphous silica particles, zeolites, diatomaceous earth, oxides such as magnesium oxide, and titanium oxide, mixtures of sodium bicarbonate with citric acid, organic bromine-containing compounds, naphthalene compounds, polycyclic aromatic hydrocarbons, carbon black, cokes, chars, graphite and diamond dust, paraffin and fatty acid derivatives such as stearate and palmitate compounds. Examples of suitable polymer particles are polyvinylchloride, polypropylene, polyethylene, acrylonitril butadiene styrene rubber, styrene butadiene rubber, styrene/maleic anhydride copolymer and cellulose. Further examples include polar polymers as described in e.g. WO 98/01501 which comprise e.g. starch, and starch modified by esterification or etherification, emulsifiers as described e.g. WO 98/01488 and WO 98/01489 which comprise bisalkylsulphosuccinates, sorbitol-$C_8$–$C_{20}$-carboxylates, and $C_8$–$C_{20}$-alkylxylene sulphonates. Particularly suitable as nucleating agent are polyethylene waxes having a weight average molecular weight of 500 to 5,000, which are typically finely divided through the polymer matrix in a quantity of 0.01–1.0% by weight, based on the amount of vinylarene, preferably from 0.1 to 0.5% by weight.

The particles may also contain anti-static additives, flame retardants such as hexabromocyclododecane, dyes, filler material, stabilisers, plasticizers, such as white oil, and lubricants. The particles are suitably coated with coating compositions comprising silicones, silicates, metal or glycerol carboxylates. Suitable carboxylates are glycerol mono-, di- and tri-stearate, zinc stearate, and mixtures thereof. Examples of such compositions have been disclosed in GB patent No. 1,409,285. Instead of stearate, one may also use citrate or palmitate. The coating compositions have been applied to the particles via dry-coating in a ribbon blender or via a slurry or solution in a readily vaporising liquid.

The pre-expanded particles are impregnated with an inorganic gas to yield impregnated particles. The pores in the pre-expanded particle are of such a size that a reasonable amount of inorganic gas can be impregnated into the pores of the particle. By "inorganic" gas it is meant that the impregnating gases according to the present invention may contain at most 1% by volume, based on the volume of the gas, of organic compounds, preferably at most 0.5% by volume. Most preferably, the gases according to the present invention do not contain any organic compounds. An example of a suitable inorganic gas is carbon dioxide. However, this interferes with the polyvinylarene matrix. Like many commercial blowing agents it dissolves to some extent into the polymer matrix. This means that for some applications it will have to be removed with effort in view of potential negative effects, e.g. in the field of safety, health or toxicology. Carbon dioxide, also being a well-known green house gas, is therefore not preferred. Preferred are inorganic gases that have no such a negative effect and that show less interaction with the polymer matrix. Examples of such gases are inorganic $N_2$- and/or $O_2$-containing gases, helium, neon and argon. More preferably, the inorganic gas used for the impregnation is selected from inorganic $N_2$- and/or $O_2$-containing gases. These gases suitably contain more than 90% by volume, based on the volume of the gas, of $N_2$ and/or $O_2$, more suitably more than 95% by volume. Most preferably, the gas is nitrogen or air. Not only do these gases hardly interfere with the polymer matrix, but they are also effective and cheap and have no negative environmental or health impact.

The impregnation can be conducted in many ways. However, it is preferred to impregnate the pre-expanded particles by the inorganic gas by exposing the particles to the gas at temperatures ranging from 0 to 95° C. Preferred temperature ranges are from 0 to 50° C., more preferably from 10 to 30° C. Most preferably, the temperature used is room temperature. This way the voids in the particles are filled with the gas without the polyvinylarene being heated such that it deforms. Such deformation might have a detrimental effect on the structure and properties of the voids and thereby it would have a negative impact on the expandability of the resulting impregnated particles. Moreover, the low temperature ensures that the particles remain free-flowing and do not stick to each other, which might occur if the impregnation would be conducted at higher temperatures.

The impregnation is suitably such that in the pores of the porous particle a pressure of 100 to 1,500 kPa gauge is achieved. Preferred pressures in the pores are between 200 and 1,000 kPa gauge, more preferably between 300 and 800 kPa gauge. Lower pressures than 100 kPa gauge would mean that the voids would merely be filled with gas, e.g. nitrogen or air, at about atmospheric pressure. Such a replacement would result in a insufficient expansion, if any. Pressures higher than 1,500 kPa gauge are possible, but these are undesirable for economical and safety reasons. The external pressure applied, needed to establish the desired pressure in the pores, is preferably from 100 to 2,000 kPa. Although it is possible to use higher external pressures, this would require better equipped pressure vessels and it would make sampling more difficult. Preferably, the maximum external pressure employed is 1,500 kPa. Suitably, the external pressure applied is the same as the desired pressure in the pores of the porous particle.

After the impregnation the impregnated particles can be taken to a conventional expansion unit and expanded further to at least 3 times the volume of the pre-expanded particle. There is no necessity to take any specific precautions in taking the particles to the expansion unit. However, it could be useful to do such via a pressure sluice.

In the expansion unit the impregnated particles are expanded to an apparent density which is at least 3 times lower than the original apparent density. Preferably, the impregnated particles are expanded to an apparent density of at least 5 times lower than $d_o$. Although the expansion can be conducted to any apparent density desired, it is practical to conduct the expansion to an apparent density which is up to 20 times, more preferably up to 40 times lower than $d_o$. It may be advantageous to carry out the expansion process in steps. Thereto, the expanded polyvinylarene particles obtained after the expansion are advantageously again impregnated ("re-impregnated") with an inorganic gas and the thus re-impregnated particles are again expanded. The process of re-impregnation can be repeated up to a number of times. However, the skilled artisan will strive to a balance between the duration of the impregnation in order to maximise the amount of impregnated gas on the one hand and a low number of repetitions of the impregnation and expansion sequence on the other. Suitably this will lead to a process in which the impregnation and expansion steps are repeated between 1 and 4 times.

As already indicated the expansion can be conducted in any conventional expansion unit. Suitable methods are the same as the well known methods as described for the pre-expansion. Preferred is the use of steam as expansion method.

As already indicated in the description above, expanded particles are suitably put into a mould and heated so that the expanded particles fuse together to produce foamed moulded articles. Therefore the invention also provides a process for preparing a foamed article in which expanded polyvinylarene particles obtained by a process according to this invention are heated in a mould till the polyvinylarene particles soften and stick together, and the heated mould thus obtained is cooled to yield a foamed article. The heating in the mould is conventional and is typically in the range from 110 to 125° C.

The invention will be illustrated by means of the following example(s)

EXAMPLES

All apparent densities were measured in accordance with the following method:

A cylindrical cup of 1000 cm$^3$ +/−2 cm$^3$ capacity, having an inside diameter of 66 mm and a height of 293 mm was weighed to the nearest 0.1 gram (atmospheric pressure, room temperature). Subsequently, the cup was filled with polyvinylarene particles. A perfectly flat metal scrapper was used to tap three times against the side of the cup and subsequently to scrape off the excess material on the top of the cup, without shaking the cup. The material in the cup was weighed to the nearest 0.1 gram and the weight of the polyvinylarene particles in grams of 1 cm$^3$ was calculated and converted to kg/m$^3$.

The pentane contents were measured with gas chromatography using N-hexane as the internal standard.

Examples 1–2

Polystyrene particles were prepared by a suspension polymerisation process. Hereto, 4,000 gram demineralised water (4 litre), 3,680 gram styrene (4 litre), conventional suspension stabilisers, 0.25% wt, based on the weight of styrene, of a polyethylene wax, and 0.25% wt white oil were mixed at a stirring rate of 475 rpm. The polymerisation was started by raising the temperature to 86° C. and by addition of peroxide initiators (0.65% wt). In addition, 0.05% wt dimer of α-methylstyrene was added. After around 6 hours, 81 gram pentane (mixture of 75% wt n-pentane and 25% wt iso-pentane) was added and the temperature was raised to around 120° C. where it was kept during 2 hours. After finishing the polymerisation, the reaction mixture was cooled.

The resulting polystyrene particles contained 2.1% by weight pentane, based on the weight of the polystyrene, and had a particle size in the range of 0.4–0.7 mm.

The polystyrene particles were pre-expanded by placing them in a water bath of 100° C. for a period of 15 minutes or by putting them in a KURTZ KV450 batch steam pre-expander using a steam pressure 80 kPa gauge at a temperature of 117° C. for a period of 30 seconds (KURTZ is a trademark). The apparent density do of the resulting pre-expanded particles was measured.

Next, the pre-expanded particles were impregnated with nitrogen gas by storing them in a pressure vessel under a pressure of 600 kPa gauge nitrogen gas at room temperature. After 3 hours, the pressure was released and the impregnated pre-expanded particles were taken out. Within half an hour, they were placed in a KURTZ KV450 batch steam expander where the particles were allowed to further expand under a pressure of, respectively, 80 and 60 kPa gauge and a temperature of, respectively, 117° C. and 114° C. for 30 seconds. From the particles thus obtained, the apparent density d was measured. In addition, the ratio do/d was calculated.

The results are indicated in table I.

Examples 3–4

The procedure of examples 1–2 was repeated, with the exception that the polystyrene particles were pre-expanded by putting them in a KURTZ KV450 batch steam pre-expander under a pressure 80 kPa gauge at a temperature of 117° C. for a period of 15, respectively 45 seconds, and that the resulting pre-expanded particles were impregnated with air instead of nitrogen.

The results are indicated in table I.

Example 5

The procedure of examples 1–2 was repeated, with the exception that the polystyrene particles were pre-expanded by subjecting them to hot air of 110° C. for 50 minutes and that the resulting pre-expanded particles were impregnated with air instead of nitrogen. The particles were further expanded using a POLYTECH batch steam expander, under a pressure of 90 kPa gauge steam and a temperature of 118.5° C. for 35 seconds (POLYTECH is a trademark). The results are shown in Table I.

TABLE I

| Example | pre-expansion | $d_o$ (kg/m$^3$) | impregnation | d (kg/m$^3$) | $d_o$/d |
|---|---|---|---|---|---|
| 1 | water bath, 100° C., 15 min | 500 | N$_2$ | 50[1] | 10.0 |
| 2 | pre-expander. Pressure 80 kPa gauge; steaming time 30 sec. | 407 | N$_2$ | 56[2] | 7.2 |
| 3 | pre-expander. Pressure 80 kPa gauge; steaming time 15 sec. | 536 | air | 54[1] | 9.9 |
| 4 | pre-expander. Pressure 80 kPa gauge; steaming time 45 sec. | 256 | air | 26[2] | 9.7 |
| 5 | hot air. 110° C. for 50 min | 436 | air | 45[3] | 9.7 |

[1]expansion under 80 kPa gauge steam pressure
[2]expansion under 60 kPa gauge steam pressure
[3]expansion under 90 kPa gauge steam pressure

Comparative Experiments 5–6

The procedure of example 2 and 4 was repeated with the exception that the pre-expanded polystyrene particles were not impregnated with respectively nitrogen gas or air.

The results are indicated in table II.

In both cases, a significantly lesser expansion was observed than for the Examples 2 and 4.

TABLE II

| Experiment | $d_o$ (kg/m$^3$) | d | $d_o/d$ |
|---|---|---|---|
| 5 | 407 | 137[1] | 3.0 |
| 6 | 256 | 63[1] | 4.1 |

[1] expansion under 60 kPa gauge steam pressure

What is claimed is:

1. Process for the preparation of expanded porous polyvinylarene particles, the steps comprising:
   a) pre-expanding unexpanded polyvinylarene particles that are impregnated with a blowing agent to an apparent density $d_o$ ranging between 600 and 200 kg/M$^3$ to form pores in said particles, said pores being of such a size that a reasonable amount of an inorganic gas can be impregnated into said pores of said particles;
   b) impregnating said inorganic gas into said pores of said pre-expanded particles; and
   c) expanding said particles of step b) to form said expanded polyvinylarene particles to an apparent density of at least three times lower than $d_o$.

2. Process according to claim 1, in which the polyvinylarene particles are polystyrene particles.

3. Process according to claim 1, in which the apparent density $d_o$ ranges from 530 to 250 kg/m$^3$.

4. Process according to claim 1, in which the polyvinylarene particles are impregnated by the inorganic gas by exposing the particles to the gas at temperatures ranging from 0 to 95° C., such that in the pores of the porous particle a pressure of 100 to 1,500 kPa gauge is achieved.

5. Process according to claim 1, in which the inorganic gas is selected from $N_2$- and/or $O_2$-containing gases.

6. Process according to claim 5, in which the inorganic gas is nitrogen or air.

7. Process according to claim 1, in which the impregnated particles are expanded to an apparent density of at least 5 times lower than $d_o$.

8. Process according to claim 1, in which the impregnated particles are expanded to an apparent density of up to 40 times lower than $d_o$.

9. Process according to claim 1, in which the impregnated particles are expanded by exposing them to steam of temperatures of 100 to 165° C. at pressures ranging from 0 to 600 kPa Gauge.

10. Process for preparing a foamed article in which expanded polyvinylarene particles obtained by a process according to claim 1 are heated in a mould till the polyvinylarene particles soften and stick together, and the heated mould thus obtained is cooled to yield a foamed article.

* * * * *